(12) United States Patent
Stoltenberg et al.

(10) Patent No.: US 11,031,704 B2
(45) Date of Patent: Jun. 8, 2021

(54) CABLE WITH NANOPARTICLE PASTE

(71) Applicant: Lockheed Martin Corporation, Bethesda, MD (US)

(72) Inventors: Randall Mark Stoltenberg, Palo Alto, CA (US); Alfred Zinn, Palo Alto, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 15/659,296

(22) Filed: Jul. 25, 2017

(65) Prior Publication Data

US 2019/0036234 A1 Jan. 31, 2019

(51) Int. Cl.
| | |
|---|---|
| *H01R 4/04* | (2006.01) |
| *H01B 9/00* | (2006.01) |
| *H01R 4/18* | (2006.01) |
| *C08K 3/08* | (2006.01) |
| *C09J 11/04* | (2006.01) |
| *C09J 9/02* | (2006.01) |

(52) U.S. Cl.
CPC ............. *H01R 4/04* (2013.01); *C08K 3/08* (2013.01); *C09J 9/02* (2013.01); *C09J 11/04* (2013.01); *H01B 9/006* (2013.01); *H01R 4/185* (2013.01); *C08K 2003/085* (2013.01); *C08K 2003/0806* (2013.01); *C08K 2003/0812* (2013.01); *C08K 2003/0831* (2013.01); *C08K 2003/0862* (2013.01); *C08K 2201/001* (2013.01); *C08K 2201/011* (2013.01); *C09J 2301/408* (2020.08)

(58) Field of Classification Search
CPC ........ H01R 4/04; H01B 9/006; H01B 13/221; C08K 2201/011; C08K 2003/0812; C08K 2003/0831; C08K 2003/085; C08K 2003/0862; C08K 3/08; C09D 5/24; G02B 6/40
USPC ......................................................... 439/371
See application file for complete search history.

(56) References Cited

U.S. PATENT DOCUMENTS

| | | | | |
|---|---|---|---|---|
| 2,798,821 A | * | 7/1957 | Lehmann ................ | H01J 9/221 427/66 |
| 3,211,821 A | * | 10/1965 | Wakefield .............. | H01B 9/027 174/26 R |
| 4,207,587 A | * | 6/1980 | Hanes .................... | G02B 6/421 257/116 |

(Continued)

FOREIGN PATENT DOCUMENTS

EP  2812139  12/2014

OTHER PUBLICATIONS

EESR dated Mar. 19, 2021.

*Primary Examiner* — Jean F Duverne
(74) *Attorney, Agent, or Firm* — Morgan, Lewis & Bockius LLP

(57) ABSTRACT

A cable can be used to facilitate electrical connections between electrical components. The cable can include a plurality of cable strands forming a void space. An adhesive paste can be applied within the void space. The adhesive paste can include a plurality of metallic nanoparticles. The metallic nanoparticles can fuse with each other and with the plurality of cable strands when energy is applied the connector and the cable. The metallic nanoparticles can include a surfactant, which can be displaced as pressure is applied. Heat can be applied to the adhesive paste to fuse the metallic nanoparticles.

17 Claims, 2 Drawing Sheets

(56) References Cited

U.S. PATENT DOCUMENTS

| | | | | |
|---|---|---|---|---|
| 4,295,250 A * | 10/1981 | Dupuy | ............... | F16G 11/02 24/122.6 |
| 4,952,012 A * | 8/1990 | Stamnitz | ............... | G02B 6/4416 385/101 |
| 5,387,129 A * | 2/1995 | Hotea | ............... | H01R 13/5205 439/276 |
| 5,636,551 A * | 6/1997 | Davidson | ............... | D07B 1/162 29/434 |
| 7,229,593 B1 * | 6/2007 | Ho | ............... | G01N 13/00 422/50 |
| 7,279,063 B2 * | 10/2007 | Yokajty | ............... | H01L 51/5246 156/275.5 |
| 7,653,511 B2 * | 1/2010 | Deram | ............... | B23K 1/203 702/182 |
| 7,905,755 B1 * | 3/2011 | Martauz | ............... | H01R 13/5205 439/877 |
| 9,161,703 B2 * | 10/2015 | Wu | ............... | A61B 5/04 |
| 2008/0058600 A1 * | 3/2008 | Bowman | ............... | A61B 1/0017 600/146 |
| 2008/0195113 A1 * | 8/2008 | Sikora | ............... | A61B 17/8822 606/93 |
| 2009/0208173 A1 * | 8/2009 | Schumann | ............... | G02B 6/40 385/77 |
| 2011/0070770 A1 * | 3/2011 | Sakai | ............... | H01R 43/005 439/521 |
| 2011/0232937 A1 * | 9/2011 | Montena | ............... | C09D 5/24 174/106 R |
| 2013/0220665 A1 * | 8/2013 | Wong | ............... | H01B 13/221 174/116 |
| 2014/0233898 A1 * | 8/2014 | Kimbrell | ............... | G02B 6/4428 385/107 |
| 2015/0027777 A1 * | 1/2015 | Drew | ............... | H01R 4/625 174/72 A |
| 2015/0054020 A1 * | 2/2015 | Paolella | ............... | H01L 23/42 257/99 |
| 2016/0238918 A1 * | 8/2016 | Nakashima | ............... | G02F 1/1677 |
| 2017/0001368 A1 * | 1/2017 | Czinger | ............... | B29C 65/02 |

* cited by examiner

CABLE WITH NANOPARTICLE PASTE

BACKGROUND

Field

The present disclosure generally relates to cables and, in particular, high reliability cable connections for high power electronics systems.

Description of the Related Art

Some high power electronic systems, including space-based systems, directed energy systems, automotive systems, and power plants, can require high reliability cable connections. Often, high power systems require cables and connectors that can deliver large current and power loads.

SUMMARY

The subject technology is illustrated, for example, according to various aspects described below.

According to some embodiments, a cable can include: a plurality of cable strands forming a void space between the plurality of cable strands; and an adhesive paste including a plurality of metallic nanoparticles disposed in the void space.

The plurality of cable strands can be copper or aluminum. The plurality of metallic nanoparticles can be copper, silver, gold, aluminum or nickel. According to some embodiments, the plurality of cable strands is copper and the plurality of metallic nanoparticles is copper. The plurality of metallic nanoparticles can each have a size about or less than 20 nm.

The adhesive paste can include a flux. The adhesive paste can be disposed at an end of the cable. The plurality of metallic nanoparticles can each include a surfactant or a coating.

According to some embodiments, a connector assembly can include: a cable including: a plurality of cable strands forming a void space between the plurality of cable strands; and an adhesive paste comprising a plurality of metallic nanoparticles disposed in the void space; and a connector including: a connector end; and a conductor connector sleeve coupled to the connector end, wherein the conductor connector sleeve receives the plurality of cable strands in a first position, and compresses the plurality of cable strands and the adhesive paste in a second position.

The plurality of metallic nanoparticles can each include a surfactant, and the surfactant can be displaced as the conductor connector sleeve is moved to the second position. According to some embodiments, as the conductor connector sleeve is moved from the first position to the second position, the void space within the conductor connector sleeve is 20 to 30 percent the volume of the original void space.

According to some embodiments, a method can include: introducing an adhesive paste into a void space of a cable including a plurality of cable strands forming the void space between the plurality of cable strands, wherein the adhesive paste includes a plurality of metallic nanoparticles.

Introducing the adhesive paste can include injecting the adhesive paste into the void space of the cable at an end of the cable or dipping an end of the cable into the adhesive paste.

The method can further include applying energy to the adhesive paste; and fusing the plurality of metallic nanoparticles to the plurality of cable strands. The method can further include applying pressure to the adhesive paste. The method can further include displacing a surfactant from the plurality of metallic nanoparticles. Applying energy to the adhesive paste can include applying heat to the adhesive paste.

The method can further include introducing the cable into a connector; introducing the plurality of cable strands into a conductor connector sleeve of the connector; and applying pressure to the conductor connector sleeve to move the conductor connector sleeve to a crimped position to apply pressure to the adhesive paste.

In the following description, specific embodiments are described to shown by way of illustration how the invention may be practiced. It is to be understood that other embodiments may be utilized and changes may be made without departing from the scope of the present invention.

DETAILED DESCRIPTION

High power electronics systems can require many high-reliability cable connections. However, many cable connections have a high electrical resistance, which may overheat and can be frequent sources of failure and reliability issues. High power electronics systems can further require large cables to efficiently and safely deliver large current and power loads. However, connection points for larger cables can often have high electrical resistance, which can cause failure at the connection point.

The present disclosure describes a cable that can be used to provide a high-reliability cable connection. Techniques of the present disclosure provide solutions that create stronger and more intimate electrical contact among the strands of the cable and between the cable and the connector, while minimizing assembly time. Techniques described herein can reduce electrical resistance, ohmic heating, and the probability of failure at a crimped cable connection point.

Figure 1:
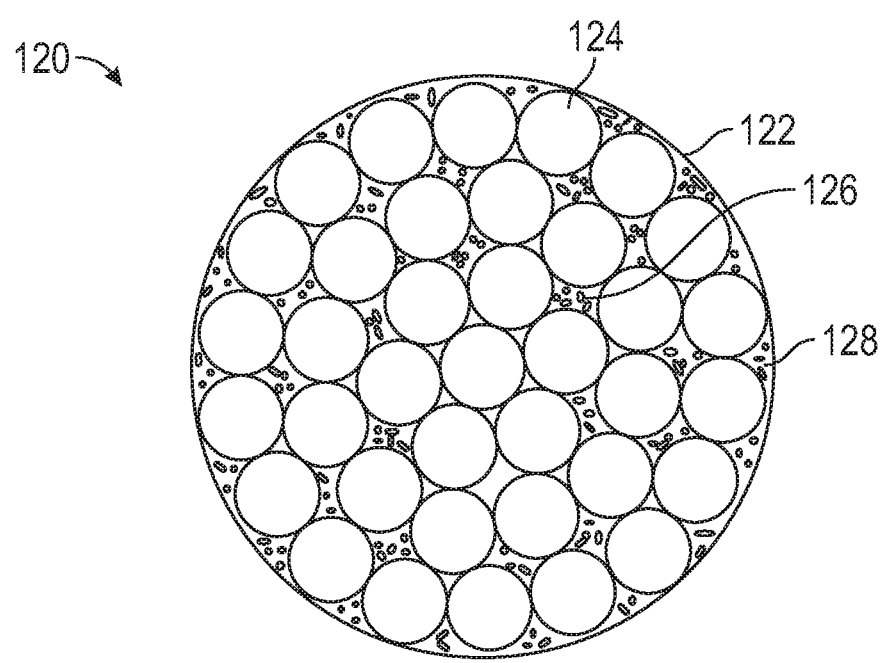
FIG. 1 illustrates a cross-sectional view of a cable, according to some embodiments of the present disclosure.

According to some embodiments, a cable can be used to conduct electricity. FIG. 1 illustrates a cross-sectional view of the cable 120, according to some embodiments of the present disclosure. According to some embodiments, for example as illustrated in FIG. 1, the cable 120 includes the insulator 122, cable strands 124, and a void space 126. The cable 120 can include an adhesive paste 128 disposed in the void space 126 between the cable strands 124. According to some embodiments, the adhesive paste 128 disposed within the cable 120 can facilitate low resistance electrical connections.

Figure 2:
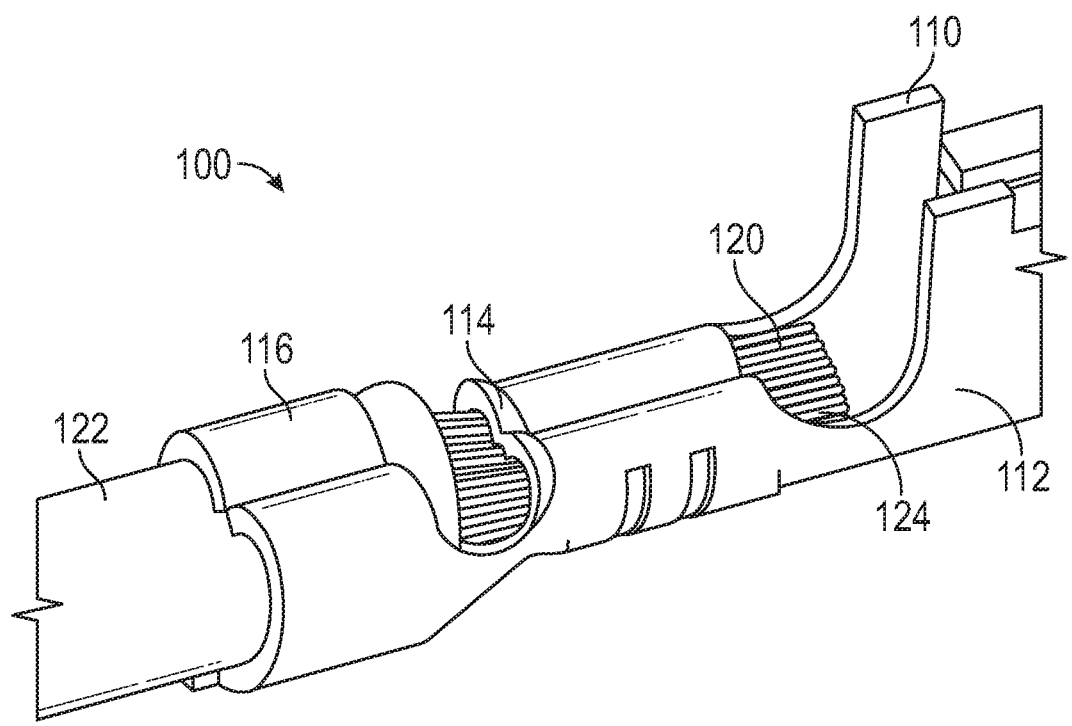
FIG. 2 illustrates a perspective view of a connector assembly, according to some embodiments of the present disclosure.

According to some embodiments, the insulator 122 is disposed around the bulk of the cable strands 124. The insulator 122 can be any suitable material and thickness in accordance with an intended application for the cable 120 and the connector 110. According to some embodiments, for example as illustrated in FIG. 2, portions of the insulator 122 can be stripped away or otherwise removed to expose the cable strands 124 to allow electrical contact with the connector 110.

According to some embodiments, the cable 120 can include a bulk or bundle of cable strands 124. The cable strands 124 can be strands of conductive material, such as metals or alloys, to conduct electricity for a desired application. According to some embodiments, the cable strands 124 can be formed from copper or aluminum. The cable strands 124 can be formed from any suitable material. In certain conditions, the cable strands 124 can be coated with an oxide layer of varying thickness depending on the age and exposure conditions of the cable strands 124. According to some embodiments, the oxide layer can lead to high resistance contacts.

According to some embodiments, for example as illustrated in FIG. 1, the cable strands 124 are generally cylindrical in shape. The cable strands 124 can be disposed in bulk or bundle, allowing the cable strands 124 to form void spaces 126 disposed between the cable strands 124 and between the cable strands 124 and the insulator 122. The void spaces 126 are generally empty spaces present in the cable 120 both before and after crimping operations. According to some embodiments, the void spaces 126 can lead to high resistance contacts.

To provide better conductivity, the void space 126 can be filled with an adhesive paste 128. The adhesive paste 128 can be a conductive paste that facilitates low resistance electrical connections and overcomes oxide layers within the cable 120. According to some embodiments, the adhesive paste 128 can be applied to the void space 126 at the end of the cable 120 that is proximal to an electrical connector. According to some embodiments, the adhesive paste 128 can be applied in the void space 126 at any desirable portion or combination of portions of the cable 120. According to some embodiments, the adhesive paste 128 can be injected from the end of the cable 120. The adhesive paste 128 can be injected via any suitable device, for example, by using a syringe. According to some embodiments, the adhesive paste 128 can be applied in any suitable manner, including, but not limited to dipping a portion of the cable 120 in the adhesive paste 128, and/or utilizing a purpose built applicator for the adhesive paste 128. According to some embodiments, the adhesive paste 128 can be applied to the cable 120 during a final assembly or during a crimping operation. According to some embodiments, the adhesive paste 128 can be pre-applied or otherwise applied at a time earlier than a cable termination operation.

The adhesive paste 128 can be a pure metal adhesive paste that contains metal nanoparticles. According to some embodiments, the nanoparticles in the adhesive paste 128 can include nanoparticles including, but are not limited to Cu, Ag, Au, Al, Ni and other suitable metals, including alloys thereof. According to some embodiments, copper nanoparticles can be utilized with copper cable strands 124 to form an all-copper connector assembly 100 to avoid brittle intermetallics. The nanoparticles can be any suitable metal or alloy that is metallurgically compatible with the cable strands 124 and the connector 110. According to some embodiments, the nanoparticles can bond with the cable strands 124 to provide metallurgical bonding and oxidation resistance for corrosive environments.

Examples of suitable nanoparticles and adhesive pastes 128 can be found in U.S. Pat. No. 9,005,483, incorporated herein by reference. Metal nanoparticles can exhibit a number of properties that differ significantly from those of the corresponding bulk metal. One property of metal nanoparticles that can be of particular importance is nanoparticle fusion or consolidation that occurs at the metal nanoparticles' fusion temperature. As used herein, the term "fusion temperature" will refer to the temperature at which a metal nanoparticle liquefies, thereby giving the appearance of melting. As used herein, the terms "fusion" or "consolidation" will refer to the coalescence or partial coalescence of metal nanoparticles with one another to form a larger mass. Upon decreasing in size, particularly below about 20 nm in equivalent spherical diameter, the temperature at which metal nanoparticles can be liquefied drops dramatically from that of the corresponding bulk metal. For example, copper nanoparticles having a size of about 20 nm or less can have fusion temperatures of about 220° C. or below, or about 200° C. or below, in comparison to bulk copper's melting point of 1083° C. Thus, the fusion of metal nanoparticles can allow bulk metal objects to be fabricated at significantly lower processing temperatures than the melting point of the corresponding bulk metal. Moreover, the lower processing temperatures can advantageously allow metal nanoparticles to be used in combination with lower quality substrates that are not particularly thermally resistant.

In various embodiments, at least a portion of the metal nanoparticles used in the adhesive paste 128 formulations can be about 20 nm or less in size. As discussed above, metal nanoparticles in this size range have fusion temperatures that are significantly lower than those of the corresponding bulk metal and readily undergo consolidation with one another as a result. In some embodiments, metal nanoparticles that are about 20 nm or less in size can have a fusion temperature of about 220° C. or below (e.g., a fusion temperature in the range of about 150° C. to about 220° C.) or about 200° C. or below, which can provide advantages that are noted above. In some embodiments, at least a portion of the metal nanoparticles can be about 10 nm or less in size, or about 5 nm or less in size. In some embodiments, at least a portion of the metal nanoparticles can range between about 1 nm in size to about 20 nm in size, or between about 1 nm in size and about 10 nm in size, or between about 1 nm in size to about 5 nm in size, or between about 3 nm in size to about 7 nm in size, or between about 5 nm in size to about 20 nm in size. In some embodiments, substantially all of the metal nanoparticles can reside within these size ranges. In some embodiments, larger metal nanoparticles can be combined in the adhesive paste 128 formulations with metal nanoparticles that are about 20 nm in size or less. For example, in some embodiments, metal nanoparticles ranging from about 1 nm to about 10 nm in size can be combined with metal nanoparticles that range from about 25 nm to about 50 nm in size, or with metal nanoparticles that range from about 25 nm to about 100 nm in size. As further discussed below, micron-scale metal particles or nanoscale particles can also be included in the adhesive paste 128 formulations in some embodiments. Although larger metal nanoparticles and micron-scale metal particles may not be liquefiable at low temperatures, they can still become consolidated upon contacting the liquefied smaller metal nanoparticles at or above their fusion temperature, as generally discussed above.

In some embodiments, adhesive paste 128 formulations described herein can contain an organic matrix and a plurality of metal nanoparticles dispersed in the organic matrix, where the adhesive paste 128 formulation contains about 30% to about 90% metal nanoparticles by weight. The adhesive paste 128 formulations maintain a fluid state and are dispensable through a micron-size aperture. In more particular embodiments, the adhesive paste 128 formulations can contain about 50% to about 90% metal nanoparticles by weight, or about 70% to about 90% metal nanoparticles by weight.

According to some embodiments, the adhesive paste 128 can further include a flux component to aid in oxide layer removal from the cable strands 124 and a connector as the adhesive paste 128 is applied to a connector assembly.

According to some embodiments, the nanoparticles are protected or coated with a volatile surfactant until bonding is desired. Examples of surfactants and surfactant systems can be found in the previously referenced U.S. Pat. No. 9,005,483. The surfactant coating can be formed on the metal nanoparticles during their synthesis. Formation of a surfactant coating on metal nanoparticles during their synthesis can desirably limit the ability of the metal nanoparticles to fuse to one another, limit agglomeration of the metal nanoparticles, and promote the formation of a population of metal nanoparticles having a narrow size distribution. In certain embodiments, the application of pressure to the adhesive paste 128 can displace the surfactant exposing the nanoparticles and bonding or fusing the adhesive paste 128 to the cable strands 124.

According to some embodiments, the nanoparticles in the adhesive paste 128 can include a coating to protect the nanoparticles until bonding is desired. According to some embodiments, the nanoparticles in the adhesive paste 128 are coated with an oxide layer, a carbon layer, or a polymer layer. According to some embodiments, the polymer layer can be formed from polyvinylpyrrolidone (PVP) or any other suitable polymer. Similarly, in certain embodiments, the application of pressure to the adhesive paste 128 can break, displace, or otherwise disrupt the coating layer to expose the underlying nanoparticles and allow for bonding or fusing of the adhesive paste 128 to the cable strands 124.

According to some embodiments, the adhesive paste 128 is formulated with a high viscosity to resist undesired flow to prevent outflow of the adhesive paste 128 during a crimping operation. In some embodiments, the adhesive paste 128 formulations can be formulated to have a desired viscosity in order to be compatible with a given application. In various embodiments, the adhesive paste 128 can have a viscosity ranging between about 1000 cP and about 250,000 cP, or between about 5,000 cP and about 200,000 cP, or between about 25,000 cP and about 250,000 cP, or between about 50,000 cP and about 250,000 cP, or between about 100,000 cP and about 250,000 cP, or between about 150,000 cP and about 250,000 cP, or between about 100,000 cP and about 200,000 cP, or between about 100,000 cP and about 200,000 cP, or between about 100,000 cP and about 150,000 cP, or between about 150,000 cP and about 200,000 cP. According to some embodiments, the adhesive paste 128 can have a flow characteristic similar to wet sand.

According to some embodiments, a connector assembly can be used to attach a connector to the cable 120 to facilitate an electrical connection. FIG. 2 illustrates a connector assembly 100, according to some embodiments of the present disclosure. According to some embodiments, for example as illustrated in FIG. 2, the connector assembly 100 can include the cable 120 at least partially disposed within a connector 110. The connector 110 can provide metallurgical compression around the cable 120 to create a common electrical path for the connector 110 and the cable 120.

According to some embodiments, at least the cable strands 124 are located within the connector 110 and crimped therein. According to some embodiments, for example as illustrated in FIG. 2, the connector 110 can include a connector end 112, a conductor connector sleeve 114 and an insulator connector sleeve 116. According to some embodiments, the connector 110 is formed from any suitable conductive material. In certain applications, the conductive material of the connector 110 can have an oxide layer of a different thickness depending on age and exposure conditions of the connector 110. The connector end 112 can be any suitable shape to allow for electrical and mechanical connection of the cable 120 to an electrical component.

Prior to a crimping operation, the cable strands 124 are disposed within the conductor connector sleeve 114 in an open position. According to some embodiments, adhesive paste 128 can be applied on the conductor connector sleeve 114 prior to the crimping process. According to some embodiments, the insulator 122 is disposed within the insulator connector sleeve 116 prior to the crimping process.

Figure 3:
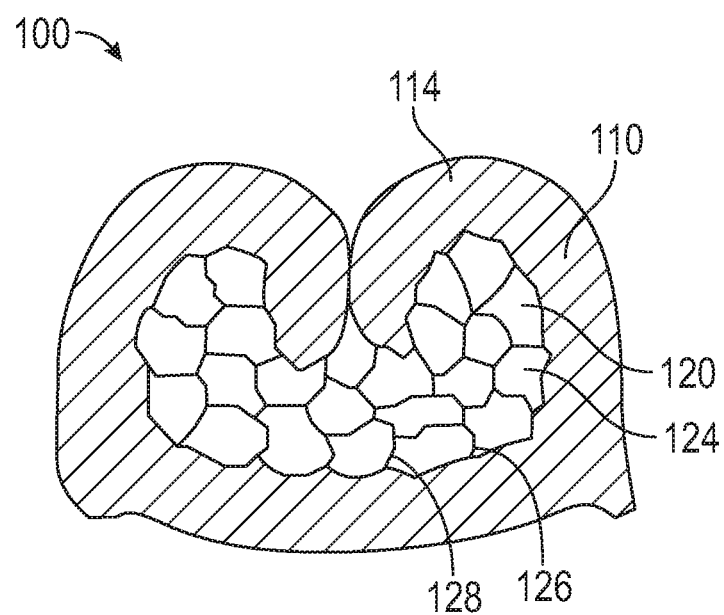
FIG. 3 illustrates a cross-sectional view of a crimped connector assembly, according to some embodiments of the present disclosure.

FIG. 3 illustrates a cross sectional view of the connector assembly 100 in a crimped position, according to some embodiments of the present disclosure. After the cable strands 124 are disposed within the conductor connector sleeve 114, a high pressure crimping operation bends the conductor connector sleeve 114 to a crimped position around the cable strands 124 and squeezes together or otherwise compresses the cable strands 124. Similarly, crimping can bend the insulator connector sleeve 116 around the insulator 122 can provide a mechanical coupling and provide strain relief to the cable 120 and the connector assembly 100 generally to withstand shock and vibration (FIG. 2).

According to some embodiments, the connector 110 is crimped in a conventional crimping operation with the cable 120, wherein the cable 120 includes the adhesive paste 128 in the void spaces 126. In the crimping operation, the cable strands 124 are compressed together in a dense packing fashion, reducing the void space 126 within the cable 120. According to some embodiments, the void space 126 is reduced to about 20-30% of the original void space 126 (FIG. 1) within the cable 120. According to some embodiments, the void space 126 is reduced to about 22% of the original void space 126 within the cable 120. The adhesive paste 128 can remain within the reduced void space 126. Advantageously, as the void space 126 is reduced after a crimping operation, only a small amount of adhesive paste 128 is required for fusing of the surfaces of the cable strands 124 and the connector 110 in a metallurgical bond of the connector assembly 110.

According to certain embodiments, any surfactants around the nanoparticles can be displaced from the connector assembly 100 as pressure is applied. Similarly, in certain embodiments, the application of pressure to the adhesive paste 128 can break or displace the coating layer of the nanoparticles to expose the underlying nanoparticles and allow for bonding or fusing of the adhesive paste to the cable strands 124.

During the crimping process, energy can be introduced into the connector assembly 100 in the form of pressure and/or heat. According to some embodiments, due to the high reactivity of the nanoparticles compared to the bulk cable strands 124, the introduced energy of the crimping operation provides sufficient energy for the nanoparticles to fuse to each other, to the cable strands 124, and to the connector 110, metallurgically bonding the connector assembly 100 as a single fused unit.

In certain conditions, pressure applied during a crimping process can introduced sufficient energy to cause fusion of the nanoparticles in the connector assembly 100. In certain embodiments, a pressure of less than 100 MPa is in the range of commercial crimping processes and can be sufficient to cause fusion within the connector assembly 100.

In certain embodiments, heat can be applied during crimping operations to introduce additional energy and allow for fusion of the nanoparticles in the adhesive paste 128 with the cable strands 124 and the connector 110. Heating can be applied through conduction, induction, or ohmic heating. In certain embodiments, the nanoparticles within connector assembly 100 can be sintered to revert the nanoparticles to a bulk state. Advantageously, this can allow for high temperature operation of the connector assembly 100.

Advantageously, the use of the adhesive paste 128 described herein allows for an improved electrical connection and reduces the resistance and ohmic heating at the connector assembly 100. Further, by utilized the methods described herein, the cable 120 and the connector 110 can become one single solid metallic unit similar to a brazed or welded assembly without the high temperatures and relative long assembly times.

Terms such as "top," "bottom," "front," "rear", "above", and "below" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A connector assembly comprising:
   a cable comprising:
      a plurality of cable strands forming a void space between the plurality of cable strands; and
      a metal adhesive paste comprising a plurality of metallic nanoparticles disposed in the void space, wherein the plurality of metallic nanoparticles each comprises a surfactant; and
   a connector comprising:
      a connector end; and
      a conductor connector sleeve coupled to the connector end, wherein the conductor connector sleeve receives the plurality of cable strands in a first position, and compresses the plurality of cable strands and the metal adhesive paste and displaces the surfactant in a second position.

2. The connector assembly of claim 1, wherein the void space in the second position of the conductor connector sleeve is about 20 to 30 percent in volume of the void space in the first position of the conductor connector sleeve.

3. The connector assembly of claim 1, wherein the metal adhesive paste comprises a viscosity ranging between 1000 cP and 250,000 cP.

4. The connector assembly of claim 1, wherein the plurality of cable strands is copper or aluminum.

5. The connector assembly of claim 1, wherein the plurality of metallic nanoparticles is copper, silver, gold, aluminum or nickel.

6. The connector assembly of claim 1, wherein the plurality of cable strands is copper and the plurality of metallic nanoparticles is copper.

7. The connector assembly of claim 1, wherein the plurality of metallic nanoparticles each have a size about or less than 20 nm.

8. The connector assembly of claim 1, wherein the adhesive paste comprises a flux.

9. The connector assembly of claim 1, wherein the adhesive paste is disposed at an end of the cable.

10. The connector assembly of claim 1, wherein the plurality of metallic nanoparticles each comprises a coating.

11. A method comprising:
   introducing a metal adhesive paste into a void space of a cable comprising a plurality of cable strands forming the void space between the plurality of cable strands, wherein the metal adhesive paste comprises a plurality of metallic nanoparticles and the plurality of metallic nanoparticles each comprises a surfactant;
   introducing the cable into a connector;
   introducing the plurality of cable strands into a conductor connector sleeve of the connector; and
   applying pressure to the conductor connector sleeve to move the conductor connector sleeve to a crimped position to apply pressure to the adhesive paste and displace the surfactant.

12. The method of claim 11, wherein introducing the adhesive paste comprises injecting the adhesive paste into the void space of the cable at an end of the cable.

13. The method of claim 11, wherein introducing the adhesive paste comprises dipping an end of the cable into the adhesive paste.

14. The method of claim 11, further comprising:
   applying energy to the adhesive paste; and
   fusing the plurality of metallic nanoparticles to the plurality of cable strands.

15. The method of claim 11, further comprising:
   applying pressure to the adhesive paste.

16. The method of claim 11, wherein applying energy to the adhesive paste comprises applying heat to the adhesive paste.

17. The method of claim 11, wherein the metal adhesive paste comprises a viscosity ranging between 1000 cP and 250,000 cP.

* * * * *